(12) United States Patent
Deng et al.

(10) Patent No.: US 12,445,060 B2
(45) Date of Patent: Oct. 14, 2025

(54) POSITIVE AND NEGATIVE BIPOLAR MODULAR MULTILEVEL ALTERNATING CURRENT-ALTERNATING CURRENT FREQUENCY CONVERTER

(71) Applicant: SOUTHEAST UNIVERSITY, Jiangsu (CN)

(72) Inventors: Fujin Deng, Jiangsu (CN); Haoran Yi, Jiangsu (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 19/224,792

(22) Filed: May 31, 2025

(65) Prior Publication Data

US 2025/0293611 A1   Sep. 18, 2025

Related U.S. Application Data

(63) Continuation of application No. PCT/CN2024/079922, filed on Mar. 4, 2024.

(30) Foreign Application Priority Data

Mar. 8, 2023 (CN) .......................... 202310214857.2

(51) Int. Cl.
*H02M 5/16* (2006.01)
*H02M 5/297* (2006.01)

(52) U.S. Cl.
CPC ............. *H02M 5/16* (2013.01); *H02M 5/297* (2013.01)

(58) Field of Classification Search
CPC ............................... H02M 5/16; H02M 5/297
See application file for complete search history.

(56) References Cited

U.S. PATENT DOCUMENTS 10,992,219 B2 * 4/2021 Takahashi ............... H02M 1/32
11,687,699 B2 * 6/2023 Deng .................... G06F 30/398
320/108

FOREIGN PATENT DOCUMENTS

| CN | 113381620 A | 9/2021 |
| CN | 114499219 A | 5/2022 |
| CN | 114513133 A | 5/2022 |
| CN | 114977754 A | 8/2022 |
| WO | 2022043452 A1 | 3/2022 |

* cited by examiner

*Primary Examiner* — Adolf D Berhane

(57) ABSTRACT

The present disclosure provides a positive and negative bipolar modular multilevel alternating current (AC)-AC frequency converter, including a modular multilevel frequency converter and a three-phase three-winding bipolar transformer. The modular multilevel frequency converter has an ABC three-phase structure, each phase includes the same upper bridge arm and lower bridge arm, and the upper and lower bridge arms include n full-bridge sub-modules (FBSMs) and a bridge arm inductor connected in series. The positive and negative bipolar modular multilevel AC-AC frequency converter can be further expanded and enable bidirectional energy flow. In the present disclosure, by introducing a positive and negative bipolar three-winding transformer, an AC-AC frequency converter topology with simple structure, high efficiency, flexibility and reliability is realized, which has high practical value.

20 Claims, 2 Drawing Sheets

POSITIVE AND NEGATIVE BIPOLAR MODULAR MULTILEVEL ALTERNATING CURRENT-ALTERNATING CURRENT FREQUENCY CONVERTER

CROSS-REFERENCE TO RELATED APPLICATIONS

This application is a continuation of PCT/CN2024/079922, filed on Mar. 4, 2024 and claims priority of Chinese Patent Application No. 202310214857.2, filed on Mar. 8, 2023, the entire contents of which are incorporated herein by reference.

TECHNICAL FIELD

The present disclosure relates to the field of multilevel power electronic converters, and in particular to a positive and negative bipolar modular multilevel alternating current (AC)-AC frequency converter.

BACKGROUND

Compared with traditional power frequency AC transmission, fractional frequency (low frequency) transmission has the advantages of strong line transmission capacity, low reactive power compensation capacity, and low line loss. It has attracted much attention in the fields of offshore wind power grid connection and long-distance AC transmission. The AC-AC frequency converter plays the role of connecting low frequency AC system and power-frequency AC system, and is the key device of fractional frequency power transmission.

At present, there are three mainstream frequency converters used in AC-AC frequency conversion: back-to-back modular multilevel converter (MMC), M3C, and Hexverter. The back-to-back MMC AC-AC frequency converter technology is relatively mature. It uses two MMCs connected on direct current (DC) sides to realize frequency conversion. The control algorithm is relatively simple and easy to understand. However, the back-to-back MMC structure uses 12 bridge arms and has a large number of sub-modules, which takes up a large volume and costs a lot in construction.

In contrast, the M3C AC-AC frequency converter uses 9 bridge arms, which reduces the number of bridge arms and reduces the manufacturing cost of the inverter. However, the internal circuit of M3C is very complex, with strong coupling and many circulating current paths, which undoubtedly increases the difficulty of its manufacturing and control.

The Hexverter AC-AC frequency converter only uses 6 bridge arms, which greatly reduces the number of bridge arms and reduces the manufacturing cost of the requency converter. However, the topological structure of Hexverter AC-AC frequency converter is difficult to further expand, the Hexverter frequency converter can only operate normally if it strictly meets the reactive power conditions, and the structure and control flexibility are poor, which is difficult to be applied in the industrial practice with changing conditions.

SUMMARY

In view of the technical problem to be solved, the present disclosure is to provide a positive and negative bipolar modular multilevel AC-AC frequency converter to overcome the deficiencies of the existing AC-AC frequency converter. A three-phase three-winding bipolar transformer included by a positive transformer and a negative transformer is introduced to simplify a system topology, reduce the construction space and cost of a frequency conversion station, and realize the bidirectional flow of energy and flexible adjustment of capacity.

Compared with the related methods, the positive and negative bipolar modular multilevel AC-AC frequency converter has less number of bridge arms, low system complexity, better scalability, flexibility and high efficiency, and is easier to realize in system construction and algorithm control.

In order to solve the above technical problems, the present disclosure is realized by adopting the following technical solutions.

A positive and negative bipolar modular multilevel AC-AC frequency converter includes a modular multilevel frequency converter and the three-phase three-winding bipolar transformer.

The modular multilevel frequency converter has an ABC three-phase structure, a power frequency side is connected to a power frequency power grid, and a low frequency side is connected to a low frequency power grid through the three-phase three-winding bipolar transformer.

The three-phase three-winding bipolar transformer includes two Y-connected secondary transformers T1 and T2, T1 is a positive transformer, and T2 is a negative transformer; and three-phase ports of the Y-connected secondary transformer T1 are connected to upper ends of three-phase upper bridge arms of the modular multilevel frequency converter, and three-phase ports of the Y-connected secondary transformer T2 are connected to lower ends of three-phase lower bridge arms of the modular multilevel frequency converter.

Further, each phase of the modular multilevel frequency converter includes the same upper bridge arm and the same lower bridge arm, and the upper and lower bridge arms respectively include n full-bridge sub-modules (FBSMs) and a bridge arm inductor connected in series.

Further, the FBSM includes first to fourth insulated gate bipolar transistors (IGBTs) and a first electrolytic capacitor, an emitter of the first IGBT is connected to a collector of the second IGBT, and a connection point is used as a positive terminal of the FBSM; an emitter of the third IGBT is connected to a collector of the fourth IGBT, and a connection point is used as a negative end of the FBSM; a collector of the first IGBT, a collector of the third IGBT and a positive electrode of the first electrolytic capacitor are connected; an emitter of the second IGBT, an emitter of the fourth IGBT and a negative electrode of the first electrolytic capacitor are connected; and the first to fourth IGBTs are all connected to anti-parallel diodes.

Further, the three-phase three-winding bipolar transformer has a T1 neutral point o and a T2 neutral point o' connected to each other.

Further, in the three-phase three-winding bipolar transformer, a voltage relationship between T1 and T2 transformer ports is that a phase difference between X and x ports is 180°, a phase difference between Y and y ports is 180°, and a phase difference between Z and z ports is 180°.

Further, an extension of a positive and negative bipolar modular multilevel AC-AC frequency converter includes two modular multilevel frequency converters and the three-phase three-winding bipolar transformer. The upper ends of the upper bridge arms of the two modular multilevel frequency converters are connected to the three-phase ports of the three-phase three-winding bipolar transformer T1, and the lower ends of the lower bridge arms of the two modular multilevel frequency converters are connected to the three-phase ports of the three-phase three-winding bipolar transformer T2.

Further, the positive and negative bipolar modular multilevel AC-AC frequency converter is expanded on the power frequency side, and the expanded positive and negative bipolar modular multilevel AC-AC frequency converter includes a plurality of modular multilevel frequency converters.

Further, the positive and negative bipolar modular multilevel AC-AC frequency converter has power flowing from the power frequency side to the low frequency side or from the low frequency side to the power frequency side.

Further, expressions of an upper bridge arm modulation wave $y_{ju}$ and a lower bridge arm modulation wave $y_{jl}$ of j (j=a, b, c) phase of the positive and negative bipolar modular multilevel AC-AC frequency converter are as follows:

$$\begin{cases} y_{ju} = y_{j\_l} - y_{j\_g} \\ y_{jl} = y_{j\_l} + y_{j\_g} \end{cases}$$

where $y_{j\_l}$ is a low frequency modulated wave component and $y_{j\_g}$ is a power frequency modulated wave component.

Further, expressions of the low frequency modulated wave $y_{j\_l}$ and the power frequency modulated wave $y_{j\_g}$ of j phase are as follows:

$$\begin{cases} y_{j\_l} = m_l \cdot \sin(\omega_l t + \theta_{jl}) - 1 \\ y_{j\_g} = m_g \cdot \sin(\omega_g t + \theta_{jg}) \end{cases}$$

where $m_g$ is a power frequency modulation degree, $m_l$ is a low frequency modulation degree, $\omega_g$ is a power frequency angular frequency, $\omega_l$ is a low frequency angular frequency, $\theta_{jg}$ is a j-phase power frequency phase shift angle, and $\theta_{jl}$ is a j-phase low frequency phase shift angle.

Further, expressions of the an upper bridge arm voltage $u_{au}$ and a lower bridge arm voltage $u_{al}$ of j phase are as follows:

$$\begin{cases} u_{ju} = \dfrac{nu_c}{2}(1 + y_{j\_l} - y_{j\_g}) \\ u_{jl} = \dfrac{nu_c}{2}(1 + y_{j\_l} + y_{j\_g}) \end{cases}$$

where n is a number of sub-modules, and $u_c$ is an average capacitor voltage of sub-modules.

By adopting the above technical solutions, compared with the related art, the present disclosure has the following beneficial technical effects.

1. According to the positive and negative bipolar modular multilevel AC-AC frequency converter provided by the present disclosure, by introducing the three-phase three-winding transformer included by the positive transformer and the negative transformer, while retaining the characteristics of modularity, the system structure is greatly simplified, and has high scalability, high efficiency and reliability, which is convenient for system construction, transformation and design control strategy.
2. According to the positive and negative bipolar modular multilevel AC-AC frequency converter provided by the present disclosure, only 6 bridge arms are used, compared with several existing mainstream frequency converter solutions, the proposed positive and negative bipolar modular multilevel AC-AC frequency converter greatly reduces the number of bridge arms, reduces the construction space and cost of frequency conversion station, and reduces the difficulty of designing control algorithm, which has high industrial value.
3. According to the positive and negative bipolar modular multilevel AC-AC frequency converter provided by the present disclosure, the bidirectional flow of energy can be realized, the capacity is flexibly adjusted, and the converter is a flexible AC-AC frequency converter. The multilevel output characteristics make the output power quality of the frequency converter higher, which is suitable for medium and high voltage AC-AC frequency conversion fields including cross-frequency transmission, offshore wind power transmission and grid connection through cross-frequency transmission, and other AC-AC frequency conversion fields, and has a wide range of application prospects.

BRIEF DESCRIPTION OF THE DRAWINGS

In order to explain the examples of the present disclosure or the technical solutions in the related art more clearly, a brief description will be given below with reference to the drawings which are used in the description of the examples or the prior art. Obviously, other drawings can be obtained according to these drawings without creative work for those ordinary skilled in the art.

DETAILED DESCRIPTION

Technical solutions in the examples of the present disclosure will be described clearly and completely in the following with reference to the accompanying drawings in the examples of the present disclosure. Obviously, all the described examples are only some, rather than all examples of the present disclosure. Based on the examples in the present disclosure, all other examples obtained by those ordinary skilled in the art without creative efforts belong to the protection scope of the present disclosure.

Figure 1:
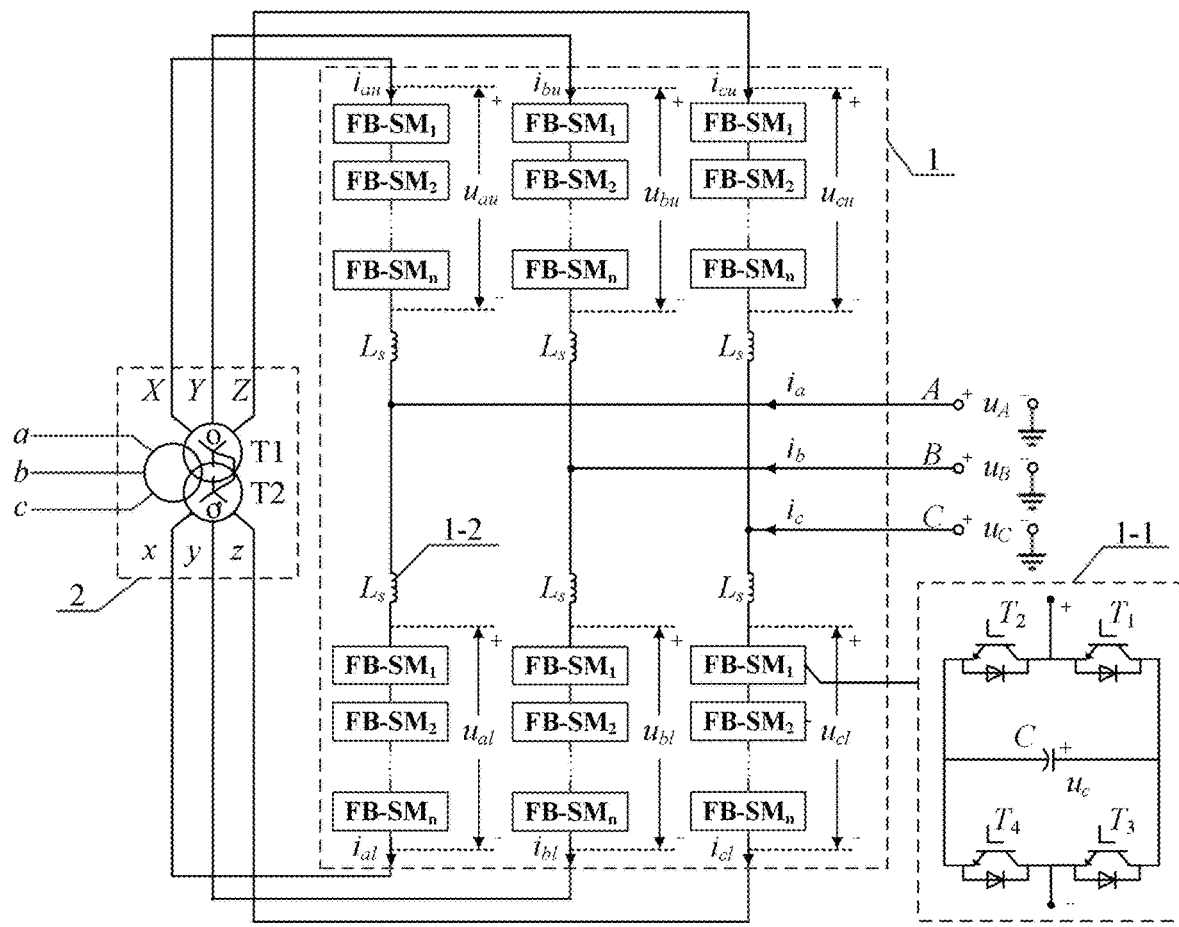
FIG. 1 is a schematic diagram of a topological structure of a positive and negative bipolar modular multilevel AC-AC frequency converter according to an example of the present disclosure.

As shown in FIG. 1, the present disclosure provides a positive and negative bipolar modular multilevel AC-AC frequency converter, the system includes two main parts: the first part is a modular multilevel frequency converter 1, the modular multilevel frequency converter is an ABC three-phase structure, each phase includes the same upper bridge arm and lower bridge arm, and the upper and lower bridge arms include n FBSMs 1-1 and a bridge arm inductor 1-2 connected in series. The second part is a three-phase three-winding bipolar transformer 2, a Y-connected secondary transformer T1 of the three-phase three-winding bipolar transformer is a positive transformer, three-phase ports of T1 are X, Y and Z, a Y-connected secondary transformer T2 is a negative transformer, and three-phase ports of T2 are x, y and z. In the proposed positive and negative bipolar modular multilevel AC-AC frequency converter, a power frequency side of the modular multilevel frequency converter is connected to a power frequency grid, and a low frequency side is connected to a low frequency grid through the three-phase three-winding bipolar transformer.

The FBSM includes first to fourth IGBTs and a first electrolytic capacitor, an emitter of the first IGBT is connected to a collector of the second IGBT, and a connection point is used as a positive terminal of the FBSM; an emitter of the third IGBT is connected to a collector of the fourth IGBT, and a connection point is used as a negative end of the FBSM; a collector of the first IGBT, a collector of the third IGBT and a positive electrode of the first electrolytic capacitor are connected; an emitter of the second IGBT, an emitter of the fourth IGBT and a negative electrode of the first electrolytic capacitor are connected; and the first to fourth IGBTs are all connected to anti-parallel diodes.

In the three-phase three-winding bipolar transformer, a neutral point o of the Y-connected secondary transformer T1 and a neutral point o' of the Y-connected secondary transformer T2 are connected to each other. A voltage relationship between T1 and T2 transformer ports is that a phase difference between X and x ports is 180°, a phase difference between Y and y ports is 180°, and a phase difference between Z and z ports is 180°.

A connection mode of the three-phase three-winding bipolar transformer and the modular multilevel frequency converter is as follows: a port X of the Y-connected secondary transformer T1 is connected to an upper end of an A-phase upper bridge arm of the modular multilevel frequency converter, a port Y is connected to an upper end of a B-phase upper bridge arm of the modular multilevel frequency converter, and a port Z is connected to an upper end of a C-phase upper bridge arm of the modular multilevel frequency converter. A port x of the Y-connected secondary transformer T2 is connected to a lower end of an A-phase lower bridge arm of the modular multilevel frequency converter, a port y is connected to a lower end of a B-phase lower bridge arm of the modular multilevel frequency converter, and a port z is connected to a lower end of a C-phase lower bridge arm of the modular multilevel frequency converter.

Figure 2:
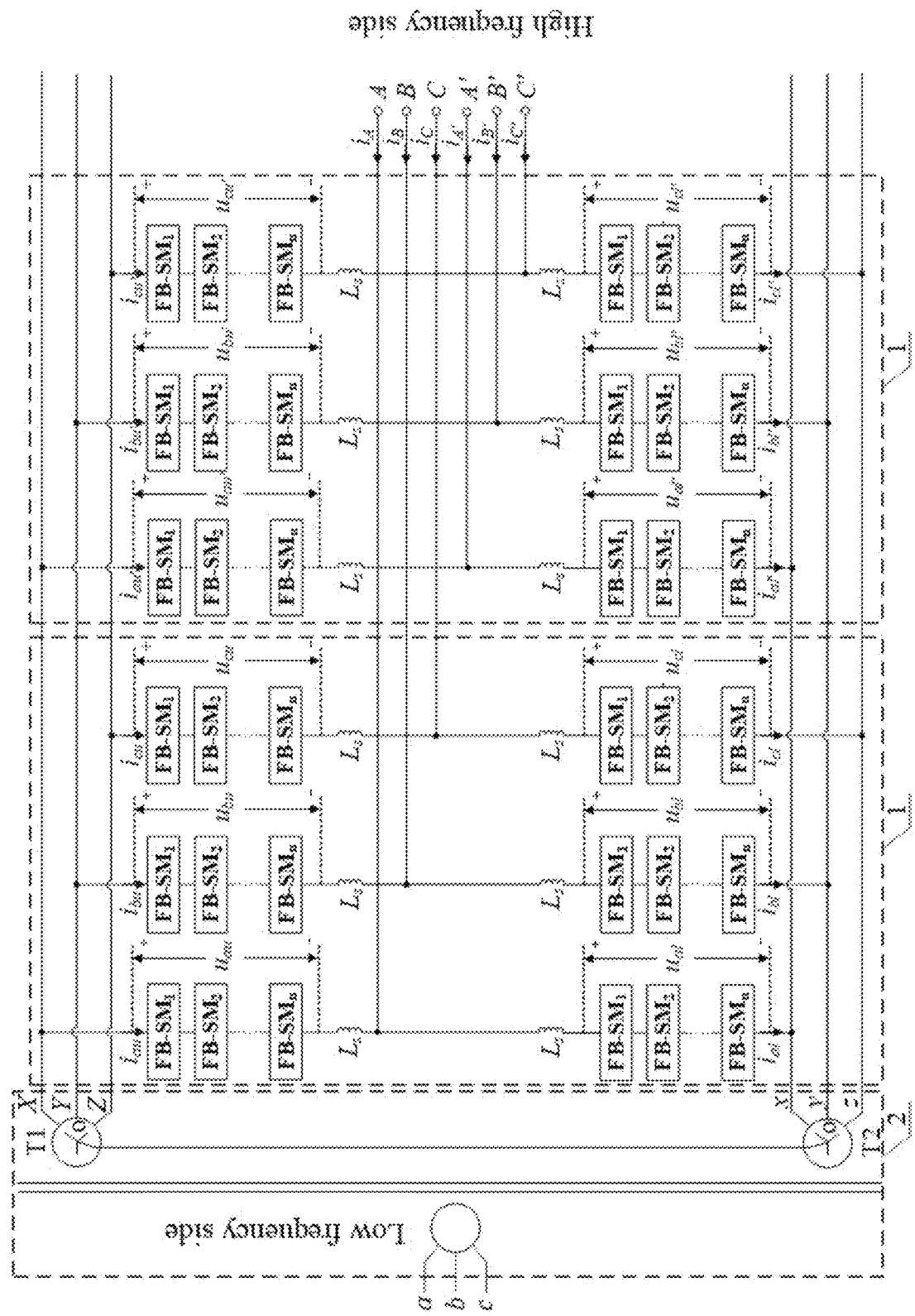
FIG. 2 is an extended schematic diagram of the positive and negative bipolar modular multilevel AC-AC frequency converter according to an example of the present disclosure.

As shown in FIG. 2, the positive and negative bipolar modular multilevel AC-AC frequency converter can be expanded on the power frequency side, and the expanded positive and negative bipolar modular multilevel AC-AC frequency converter can include M (M is greater than or equal to 2) modular multilevel frequency converters and the three-phase three-winding bipolar transformer. FIG. 2 shows the extended modular multilevel AC-AC frequency converter with M=2, the upper ends of the upper bridge arms of three phases A, B, and C and three phases A', B', and C' are connected to the ports X, Y, and Z of the three-phase three-winding bipolar transformer T1, and the lower ends of the lower bridge arms of three phases A, B, and C and three phases A', B', and C' are connected to the ports x, y, and z of the three-phase three-winding bipolar transformer T2.

In the positive and negative bipolar modular multilevel AC-AC frequency converter, power can flow from the power frequency side to the low frequency side, and can also flow from the low frequency side to the power frequency side.

When the positive and negative bipolar modular multilevel AC-AC frequency converter is controlled, expressions of an upper bridge arm modulation wave $y_{ju}$ and a lower bridge arm modulation wave $y_{jt}$ of j (j=a, b, c) phase are as follows:

$$\begin{cases} y_{ju} = y_{j\_l} - y_{j\_g} \\ y_{jl} = y_{j\_l} + y_{j\_g} \end{cases}$$

where $y_{j\_l}$ is a low frequency modulated wave component, $y_{j\_g}$ is a power frequency modulated wave component, and the expressions are as follows:

$$\begin{cases} y_{j\_l} = m_l \cdot \sin(\omega_l t + \theta_{jl}) - 1 \\ y_{j\_g} = m_g \cdot \sin(\omega_g t + \theta_{jg}) \end{cases}$$

where $m_g$ is a power frequency modulation degree, $m_l$ is a low frequency modulation degree, $\omega_g$ is a power frequency angular frequency, $\omega_l$ is a low frequency angular frequency, $\theta_{jg}$ is a j-phase power frequency phase shift angle, and $\theta_{jt}$ is a j-phase low frequency phase shift angle.

Expressions of an upper bridge arm voltage $u_{au}$ and a lower bridge arm voltage $u_{al}$ of j phase are as follows:

$$\begin{cases} u_{ju} = \frac{nu_c}{2}(1 + y_{j\_l} - y_{j\_g}) \\ u_{jl} = \frac{nu_c}{2}(1 + y_{j\_l} + y_{j\_g}) \end{cases}$$

where n is a number of sub-modules, and $u_c$ is an average capacitor voltage of sub-modules.

In the description of this specification, descriptions referring to the terms "an example", "an instance", "a specific instance", etc., mean that specific features, structures, materials, or characteristics described in connection with the example or instance are included in at least one example or instance of the present disclosure. In this specification, schematic representations of the above terms do not necessarily refer to the same example or instance. Furthermore, the specific features, structures, materials, or characteristics described may be combined in any suitable manner in any one or more examples or instances.

The basic principle, main features and advantages of the present disclosure have been shown and described above. It is to be understood by those skilled in the art that the present disclosure is not limited by the above-mentioned examples, and what is described in the above-mentioned examples and descriptions only illustrates the principles of the present disclosure. There will be various changes and improvements in the present disclosure without departing from the spirit and scope of the present disclosure, which fall within the scope of the claimed protection of the present disclosure.

The invention claimed is:

1. A positive and negative bipolar modular multilevel alternating current (AC)-AC frequency converter, comprising a modular multilevel frequency converter and a three-phase three-winding bipolar transformer, wherein
the modular multilevel frequency converter has an ABC three-phase structure, a power frequency side is connected to a power frequency power grid, and a low frequency side is connected to a low frequency power grid through the three-phase three-winding bipolar transformer;
the three-phase three-winding bipolar transformer comprises two Y-connected secondary transformers T1 and T2, T1 is a positive transformer, and T2 is a negative transformer; and three-phase ports of the Y-connected secondary transformer T1 are connected to upper ends of three-phase upper bridge arms of the modular multilevel frequency converter, and three-phase ports of the Y-connected secondary transformer T2 are connected to lower ends of three-phase lower bridge arms of the modular multilevel frequency converter; and in the three-phase three-winding bipolar transformer, a neutral point o of T1 and a neutral point o' of T2 are connected with each other, a voltage relationship between T1 and T2 transformer ports is that a phase difference between X and x ports is 180°, a phase difference between Y and y ports is 180°, and a phase difference between Z and z ports is 180°.

2. The positive and negative bipolar modular multilevel AC-AC frequency converter according to claim 1, wherein each phase of the modular multilevel frequency converter comprises the same upper bridge arm and the same lower bridge arm, and the upper and lower bridge arms respectively comprise n full-bridge sub-modules (FBSMs) and a bridge arm inductor connected in series.

3. The positive and negative bipolar modular multilevel AC-AC frequency converter according to claim 2, wherein the FBSM comprises first to fourth insulated gate bipolar transistors (IGBTs) and a first electrolytic capacitor, an emitter of the first IGBT is connected to a collector of the second IGBT, and a connection point is used as a positive terminal of the FBSM; an emitter of the third IGBT is connected to a collector of the fourth IGBT, and a connection point is used as a negative end of the FBSM; a collector of the first IGBT, a collector of the third IGBT and a positive electrode of the first electrolytic capacitor are connected; an emitter of the second IGBT, an emitter of the fourth IGBT and a negative electrode of the first electrolytic capacitor are connected; and the first to fourth IGBTs are all connected to anti-parallel diodes.

4. The positive and negative bipolar modular multilevel AC-AC frequency converter according to claim 1, wherein a number of modular multilevel frequency converters is M, all of which are on the power frequency side, M is a positive integer greater than or equal to 1, the upper ends of the upper bridge arms of the M modular multilevel frequency converters are connected to the three-phase ports of the three-phase three-winding bipolar transformer T1, and the lower ends of the lower bridge arms of the M modular multilevel frequency converters are connected to the three-phase ports of the three-phase three-winding bipolar transformer T2.

5. The positive and negative bipolar modular multilevel AC-AC frequency converter according to claim 1, wherein the positive and negative bipolar modular multilevel AC-AC frequency converter has power flowing from the power frequency side to the low frequency side or from the low frequency side to the power frequency side.

6. The positive and negative bipolar modular multilevel AC-AC frequency converter according to claim 2, wherein the positive and negative bipolar modular multilevel AC-AC frequency converter has power flowing from the power frequency side to the low frequency side or from the low frequency side to the power frequency side.

7. The positive and negative bipolar modular multilevel AC-AC frequency converter according to claim 3, wherein the positive and negative bipolar modular multilevel AC-AC frequency converter has power flowing from the power frequency side to the low frequency side or from the low frequency side to the power frequency side.

8. The positive and negative bipolar modular multilevel AC-AC frequency converter according to claim 4, wherein the positive and negative bipolar modular multilevel AC-AC frequency converter has power flowing from the power frequency side to the low frequency side or from the low frequency side to the power frequency side.

9. The positive and negative bipolar modular multilevel AC-AC frequency converter according to claim 1, wherein the positive and negative bipolar modular multilevel AC-AC frequency converter has an upper bridge arm modulation wave $y_{ju}$ and a lower bridge arm modulation wave $y_{jt}$ of j phase calculated by using the following formulas:

$$\begin{cases} y_{ju} = y_{j\_l} - y_{j\_g} \\ y_{jl} = y_{j\_l} + y_{j\_g} \end{cases}$$

where $y_{j\_l}$ is a low frequency modulated wave component, $y_{j\_g}$ is a power frequency modulated wave component, and j=a, b, c.

10. The positive and negative bipolar modular multilevel AC-AC frequency converter according to claim 2, wherein the positive and negative bipolar modular multilevel AC-AC frequency converter has an upper bridge arm modulation wave $y_{ju}$ and a lower bridge arm modulation wave $y_{jt}$ of j phase calculated by using the following formulas:

$$\begin{cases} y_{ju} = y_{j\_l} - y_{j\_g} \\ y_{jl} = y_{j\_l} + y_{j\_g} \end{cases}$$

where $y_{j\_l}$ is a low frequency modulated wave component, $y_{j\_g}$ is a power frequency modulated wave component, and j-a, b, c.

11. The positive and negative bipolar modular multilevel AC-AC frequency converter according to claim 3, wherein the positive and negative bipolar modular multilevel AC-AC frequency converter has an upper bridge arm modulation wave $y_{ju}$ and a lower bridge arm modulation wave $y_{jt}$ of j phase calculated by using the following formulas:

$$\begin{cases} y_{ju} = y_{j\_l} - y_{j\_g} \\ y_{jl} = y_{j\_l} + y_{j\_g} \end{cases}$$

where $y_{j\_l}$ is a low frequency modulated wave component, $y_{j\_g}$ is a power frequency modulated wave component, and j=a, b, c.

12. The positive and negative bipolar modular multilevel AC-AC frequency converter according to claim 4, wherein the positive and negative bipolar modular multilevel AC-AC frequency converter has an upper bridge arm modulation wave $y_{ju}$ and a lower bridge arm modulation wave $y_{jt}$ of j phase calculated by using the following formulas:

$$\begin{cases} y_{ju} = y_{j\_l} - y_{j\_g} \\ y_{jl} = y_{j\_l} + y_{j\_g} \end{cases}$$

where $y_{j\_l}$ is a low frequency modulated wave component, $y_{j\_g}$ is a power frequency modulated wave component, and j=a, b, c.

13. The positive and negative bipolar modular multilevel AC-AC frequency converter according to claim 9, wherein expressions of the low frequency modulation wave $y_{j\_l}$ and the power frequency modulation wave $y_{j\_g}$ of j phase are as follows:

$$\begin{cases} y_{j\_l} = m_l \cdot \sin(\omega_l t + \theta_{jl}) - 1 \\ y_{j\_g} = m_g \cdot \sin(\omega_g t + \theta_{jg}) \end{cases}$$

where $m_g$ is a power frequency modulation degree, $m_i$ is a low frequency modulation degree, $\omega_g$ is a power frequency angular frequency, $\omega_i$ is a low frequency angular frequency, $\theta_{jg}$ is a j-phase power frequency phase shift angle, and $\theta_{jt}$ is a j-phase low frequency phase shift angle.

14. The positive and negative bipolar modular multilevel AC-AC frequency converter according to claim 10, wherein expressions of the low frequency modulation wave $y_{j\_l}$ and the power frequency modulation wave $y_{j\_g}$ of j phase are as follows:

$$\begin{cases} y_{j\_l} = m_l \cdot \sin(\omega_l t + \theta_{jl}) - 1 \\ y_{j\_g} = m_g \cdot \sin(\omega_g t + \theta_{jg}) \end{cases}$$

where $m_g$ is a power frequency modulation degree, $m_i$ is a low frequency modulation degree, $\omega_g$ is a power frequency angular frequency, $\omega_i$ is a low frequency angular frequency, $\theta_{jg}$ is a j-phase power frequency phase shift angle, and $\theta_{jt}$ is a j-phase low frequency phase shift angle.

15. The positive and negative bipolar modular multilevel AC-AC frequency converter according to claim 11, wherein expressions of the low frequency modulation wave $y_{j\_l}$ and the power frequency modulation wave $y_{j\_g}$ of j phase are as follows:

$$\begin{cases} y_{j\_l} = m_l \cdot \sin(\omega_l t + \theta_{jl}) - 1 \\ y_{j\_g} = m_g \cdot \sin(\omega_g t + \theta_{jg}) \end{cases}$$

where $m_g$ is a power frequency modulation degree, $m_i$ is a low frequency modulation degree, $\omega_g$ is a power frequency angular frequency, $\omega_i$ is a low frequency angular frequency, $\theta_{jg}$ is a j-phase power frequency phase shift angle, and $\theta_{jt}$ is a j-phase low frequency phase shift angle.

16. The positive and negative bipolar modular multilevel AC-AC frequency converter according to claim 12, wherein expressions of the low frequency modulation wave $y_{j\_l}$ and the power frequency modulation wave $y_{j\_g}$ of j phase are as follows:

$$\begin{cases} y_{j\_l} = m_l \cdot \sin(\omega_l t + \theta_{jl}) - 1 \\ y_{j\_g} = m_g \cdot \sin(\omega_g t + \theta_{jg}) \end{cases}$$

where $m_g$ is a power frequency modulation degree, $m_i$ is a low frequency modulation degree, $\omega_g$ is a power frequency angular frequency, $\omega_i$ is a low frequency angular frequency, $\theta_{jg}$ is a j-phase power frequency phase shift angle, and $\theta_{jt}$ is a j-phase low frequency phase shift angle.

17. The positive and negative bipolar modular multilevel AC-AC frequency converter according to claim 13, wherein expressions of an upper bridge arm voltage $u_{ju}$ and a lower bridge arm voltage $u_{jl}$ of j phase are as follows:

$$\begin{cases} u_{ju} = \frac{nu_c}{2}(1 + y_{j\_l} - y_{j\_g}) \\ u_{jl} = \frac{nu_c}{2}(1 + y_{j\_l} + y_{j\_g}) \end{cases}$$

where n is a number of sub-modules, and $u_c$ is an average capacitor voltage of sub-modules.

18. The positive and negative bipolar modular multilevel AC-AC frequency converter according to claim 14, wherein expressions of an upper bridge arm voltage $u_{ju}$ and a lower bridge arm voltage $u_{jl}$ of j phase are as follows:

$$\begin{cases} u_{ju} = \frac{nu_c}{2}(1 + y_{j\_l} - y_{j\_g}) \\ u_{jl} = \frac{nu_c}{2}(1 + y_{j\_l} + y_{j\_g}) \end{cases}$$

where n is a number of sub-modules, and $u_c$ is an average capacitor voltage of sub-modules.

19. The positive and negative bipolar modular multilevel AC-AC frequency converter according to claim 15, wherein expressions of an upper bridge arm voltage $u_{ju}$ and a lower bridge arm voltage $u_{jl}$ of j phase are as follows:

$$\begin{cases} u_{ju} = \frac{nu_c}{2}(1 + y_{j\_l} - y_{j\_g}) \\ u_{jl} = \frac{nu_c}{2}(1 + y_{j\_l} + y_{j\_g}) \end{cases}$$

where n is a number of sub-modules, and $u_c$ is an average capacitor voltage of sub-modules.

20. The positive and negative bipolar modular multilevel AC-AC frequency converter according to claim 16, wherein expressions of an upper bridge arm voltage $u_{ju}$ and a lower bridge arm voltage $u_{jl}$ of j phase are as follows:

$$\begin{cases} u_{ju} = \frac{nu_c}{2}(1 + y_{j\_l} - y_{j\_g}) \\ u_{jl} = \frac{nu_c}{2}(1 + y_{j\_l} + y_{j\_g}) \end{cases}$$

where n is a number of sub-modules, and $u_c$ is an average capacitor voltage of sub-modules.

* * * * *